Aug. 2, 1960   A. L. LEGGETT   2,947,496
JET PROPELLED AIRCRAFT
Filed Sept. 28, 1955   4 Sheets-Sheet 1

INVENTOR.
ARCHIE L. LEGGETT
BY
J.B.Dickman Jr
ATTORNEY

Aug. 2, 1960

A. L. LEGGETT 2,947,496

JET PROPELLED AIRCRAFT

Filed Sept. 28, 1955

4 Sheets-Sheet 2

INVENTOR.
ARCHIE L. LEGGETT
BY
J.B.Dickman Jr.
ATTORNEY

Aug. 2, 1960  A. L. LEGGETT  2,947,496
JET PROPELLED AIRCRAFT
Filed Sept. 28, 1955  4 Sheets-Sheet 3
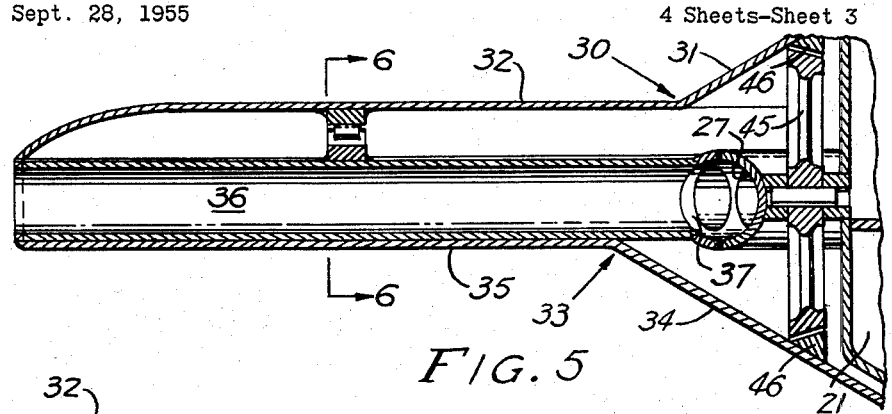
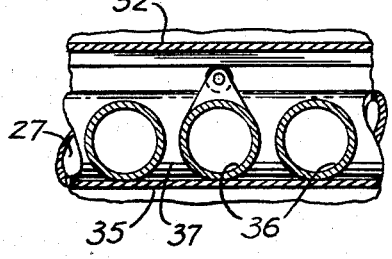
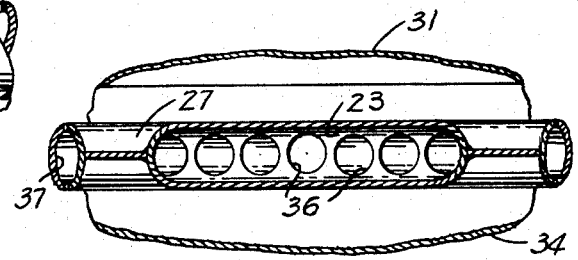
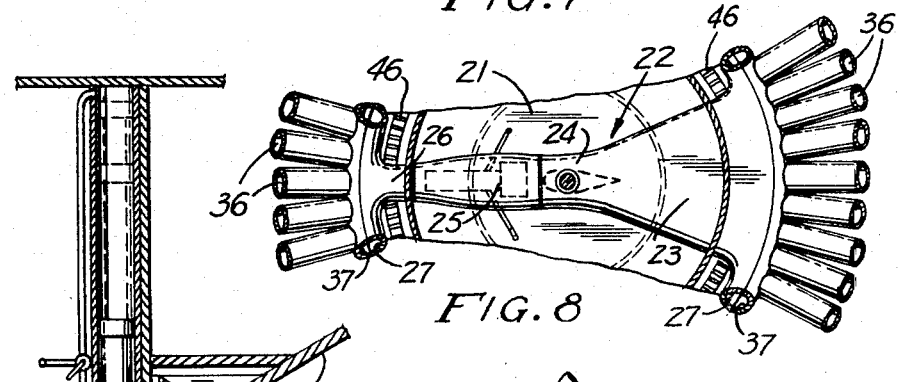
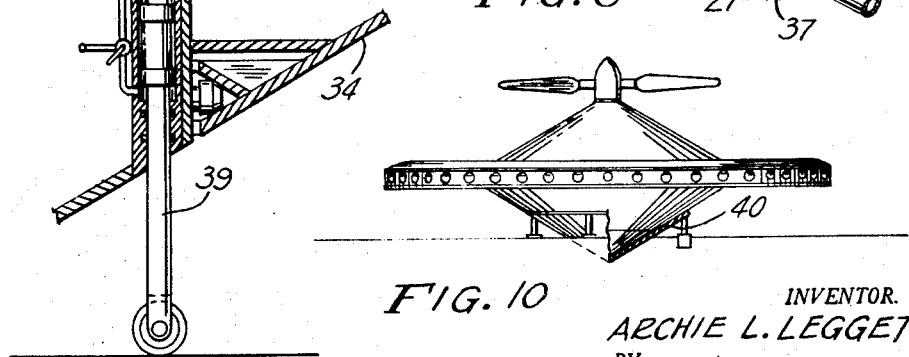
INVENTOR.
ARCHIE L. LEGGETT
BY
J.B.Dickman, Jr.
ATTORNEY Aug. 2, 1960 — A. L. LEGGETT — 2,947,496
JET PROPELLED AIRCRAFT
Filed Sept. 28, 1955 — 4 Sheets-Sheet 4
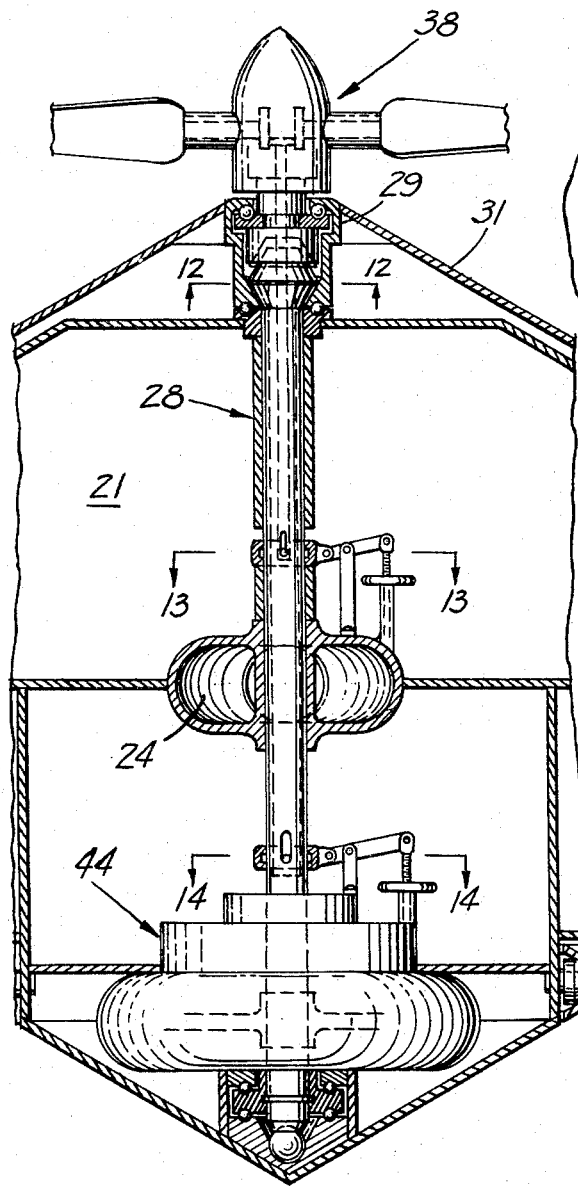
FIG. 11
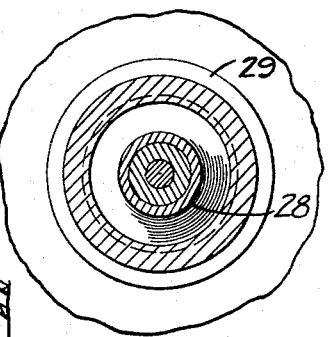
FIG. 12
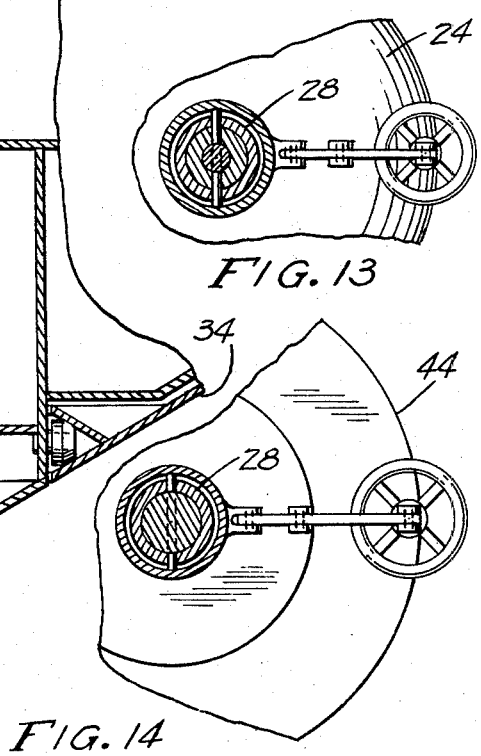
FIG. 13
FIG. 14
INVENTOR.
ARCHIE L. LEGGETT
BY
J. B. Dickman Jr.
ATTORNEY

United States Patent Office 2,947,496
Patented Aug. 2, 1960

2,947,496

JET PROPELLED AIRCRAFT

Archie L. Leggett, 1141 S. Elden Ave.,
Los Angeles 6, Calif.

Filed Sept. 28, 1955, Ser. No. 537,127

5 Claims. (Cl. 244—12)

This invention relates primarily to rocket ship construction for interplanetary or satellite travel, although it is adaptable to jet propulsion within the earth's atmosphere particularly at high altitudes.

The main object is to build a gyro-stabilized rotating annular disc-shaped airfoil with a stationary enlarged central compartment for power plants, fuel, crew, etc.

A further object is to mount a comparatively small power plant in the above central compartment for rotating the disc-shaped airfoil substantially centrally of the compartment to obtain gyro-stabilization for the craft, and a jet or rocket power plant centrally and horizontally mounted in the compartment for propulsion of the craft through the air if jet powered, or through space if rocket propelled.

A further object is to provide the annular disc with radially extending annularly equally spaced passages for serving as inlets to the propelling plant while passing around the leading edge and as exhausts or outlets from said plant while passing around the trailing edge of the overall rotating disc.

A further object is to synchronize the speeds of rotation of the disc and the frequency of the intermittent or resonant combustion so as to obtain maximum efficiency in the overall power plant.

Figure 1:
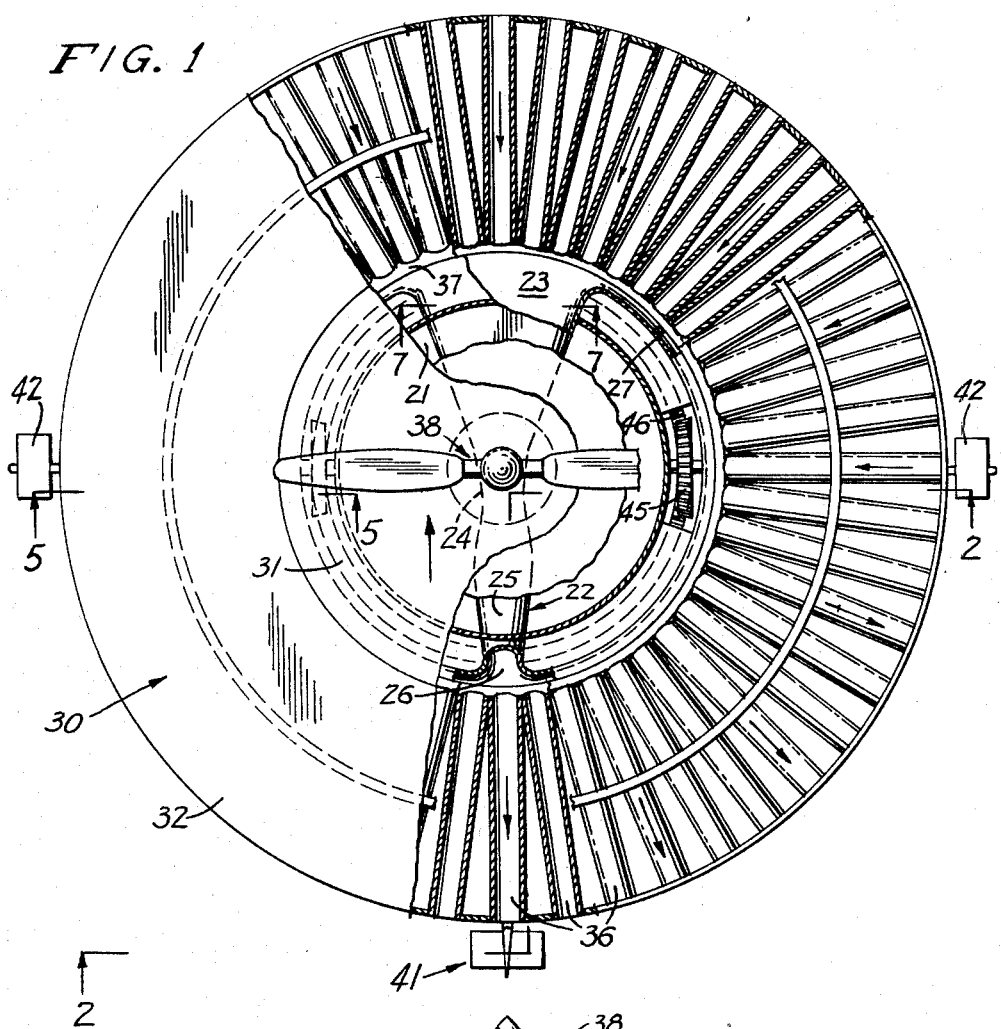
Figure 2:
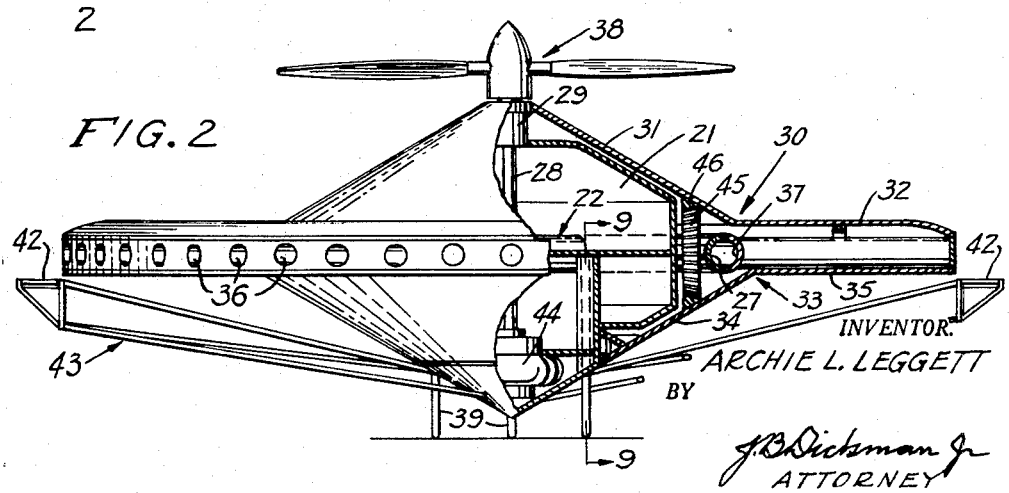
Figure 3:
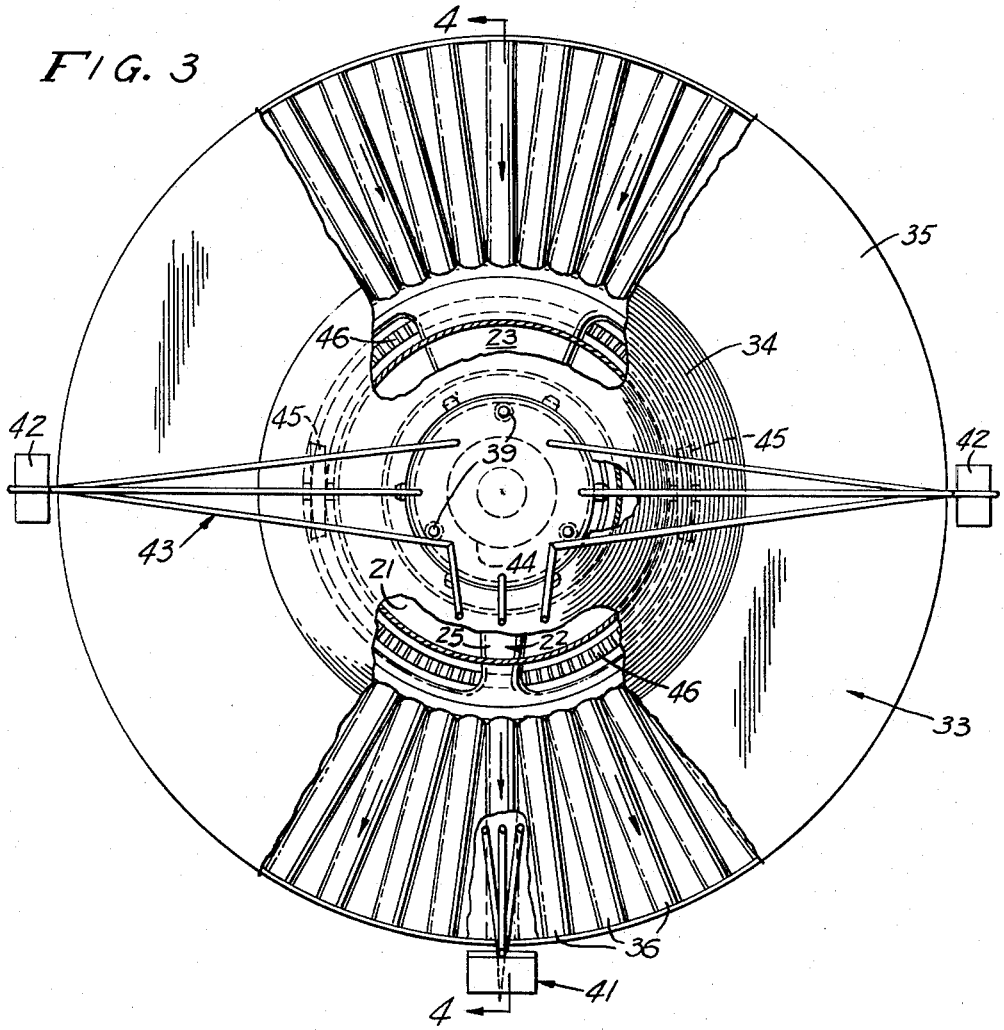
Figure 4:
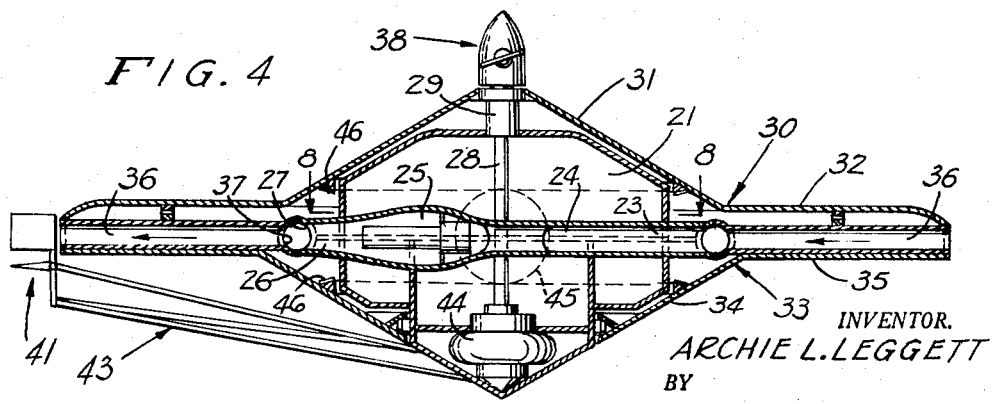

Other and more specific objects will become apparent in the following detailed description of one form of the invention shown for purposes of illustration in the accompanying drawings, wherein:

Fig. 1 is a plan view of one preferred form of the invention, with parts broken away to show the internal structure, Fig. 2 is an elevational view partly in section taken on the line 2—2 of Fig. 1, Fig. 3 is bottom view with portions broken away, Fig. 4 is a sectional view taken on the lines 4—4 of Fig. 3, Fig. 5 is an enlarged detail view in section of the annular airfoil structure, Fig. 6 is a section taken on the line 6—6 of Fig. 5, Fig. 7 is an enlarged sectional view taken on the line 7—7 of Fig. 1, Fig. 8 is a sectional view taken on the line 8—8 of Fig. 4, Fig. 9 is an enlarged sectional detail view taken on line 9—9 of Fig. 2, Fig. 10 illustrates a modified landing means, Fig. 11 is an enlarged detailed sectional view of the central portion of the craft, and Figs. 12, 13 and 14 are further enlarged detail views taken on correspondingly numbered section lines in Fig. 11.

The basic construction of the present invention may include either a spherical or double conical central stationary compartment 21 having a resonant or intermittent jet engine 22 diametrically positioned therein. The engine may comprise an impact chamber 23 at its front end, a mixing nozzle 24 at its middle portion followed by the combustion chamber 25 and exhaust or thrust nozzle 26. The impact chamber 23 and the nozzle 26 both terminate in a peripheral channel 27 at the common base level of the opposed conical halves of compartment 21. A central shaft 28 extends vertically through this compartment. Shaft 28 is provided with a bearing 29 just above the compartment 21 for rotatively supporting an upper disc 30 having a conical central portion 31 closely conforming to the conical upper half of compartment 21, and an annular portion 32. Another annular disc 33 may be rotatively mounted under the lower half of compartment 21, having a frusto-conical central portion 34 and an annular outer portion 35 with a continuous series of radially disposed passages 36 opening at their inner ends into a circular channel 37. Channel 27 is open outwardly and cooperates with the inwardly open channel 37, to form an annular passage completely around the craft.

A propeller 38 may be provided at the upper end of shaft 28. This may be used to assist take-offs and landings by reducing the required minimum forward speed for these maneuvers, and to provide a supplementary source of lift during flight at lower speeds to prevent stalling. It could also be used for vertical take-offs and landings in close quarters.

For vertical take-off and landing, three legs 39 may be extended from the exposed underside of the stationary compartment 21, or conical berths 40 like the one illustrated in Fig. 10 may be provided. A light tubular framework 43 may be extended from this underside of compartment 21 to the rear or trailing edge of the disc 35, for supporting a small tail surface, elevators and rudder unit 41, and to the sides of this disc to support small aileron surfaces 42.

The primary stabilization of this craft is derived from the rotation of the discs 30 and 33, the speed of rotation of which is controlled by the auxiliary power plant 44. This may be a turbine engine driving the shaft 28 which is connected through suitable clutches to drive these discs 30 and 33 or the propeller 38, independently or together. It will be noted here that the stabilizing effects of the upper disc, the mass of which is obviously much smaller than that of the lower disc, will not counterbalance those of the lower disc. At the same time, the rotational drags of the upper and lower disc surfaces will counterbalance each other, so as to prevent a turning moment on the craft as a whole, when operating in air.

When jet propulsion is used the speed of discs 30 and 33 is adjusted in accordance with the resonant frequency of combustion in the jet engine, so that each of the passages 36 will respond in acoustical resonance to the frequency of the combustion completely once during each turn of the disc 33, and will thus aid in the performance of the resonant jet engine to maintain a high efficiency by synchronizing the acoustic resonance of the passages with the combustion frequency. At the proper speed of rotation of disc 33, the fore and aft component of the flow of air or exhaust gases through each passage 36 will vary in sinusoidal fashion in accordance with the angular position of the passage cyclically and in synchronism with the travel of the peak pressure waves therein. As the passage 36 enters the forward semi-circle of its travel its gases have just started to reverse their direction of travel due to the impact pressure building up at the outer opening. The impact pressure wave and flow acceleration reach a maximum effect simultaneously when the passage passes a forwardly position substantially parallel to the direction of flight, and subside when the passage is substantially 90° further. The flow and the combustion pressure wave then reverse the direction of travel and acceleration of the gases, from which the thrust is obtained, through the passage, reaching a maximum fore and aft speed of flow and expansion when the passage is directly rearward in line with the jet engine outlet nozzle.

A relatively high efficiency of either a resonant or an intermittent jet engine may thus be attained, while the high speed of rotation of the discs will provide a gyroscopic stabilization, obviating the necessity of a separate gyroscopic or other stabilizing means. It is contemplated that the deleterious effect of centrifugal forces on the gases around the forward half of turn of passages 36 will be compensated by the equally helpful effect around the rearward half.

The effect of the forward speed on the cyclic flow through the passages 36 will not be appreciable normally because of the relatively high speed of rotation required. However, at very high forward speeds of flight, it may be compensated for by angularly turning the jet engine inlet with respect to the flight path opposite to the direction of rotation. In other words, as the extremities of passages 36 turn around their forward semicircular journey, during the quarter turn before they reach the forward axial position, the increasing impact of the entering stream of air is accelerated by the forward component of their rotational speed to a maximum, and during the following quarter turn the impact will be decelerated by the increasing rearward component of their rotational speed. Thus the range of maximum impact will be shifted from the line of flight to the side of the forwardly rotating extremities to an extent depending on the relative speeds of rotation and forward flight. This is the side of the flight path opposite to the direction of rotation.

It should be clear that the speed of rotation of the disc with the passages 36 will be controlled so as to synchronize it with the resonance of the passages and the engine for maximum overall efficiency of the engine, by maintaining the cycles of rotation to correspond with the cycles of resonance, whereby the resonance of each passage 36 will assist the admission of the impact air during its rotation about the leading edge of the discs, as well as the discharge of the jet gases from the combustion chamber during its rotation about the trailing edge of the discs.

The legs 39 may be provided with swivelled wheels (not shown) having streamlined vanes for turning them in the direction of the airstream for facilitating a landing on or a take-off from a runway.

In this type of craft, the lower half of the compartment 21 may be used mainly for fuel storage besides the auxiliary engine, while the upper half may be occupied by the necessary instruments, controls, crew and pay load.

The lower disc 33 may be driven from the upper disc 30 in the opposite direction through a pair of bevel gears 45 mounted on horizontal axes in the stationary compartment 21 and meshing with beveled ring gears 46 on the conical portions 31 and 34 of the upper and lower discs 30 and 33 respectively. The gyroscopic effect desired may then be obtained by a proper apportioning of the difference in the momentums of the oppositely rotating discs.

The same gyroscopic effect would be somewhat more difficult to obtain if there were only one rotating disc, as e.g., if the passages 36 were made integral with the upper disc 30, and the lower disc 33 and its drive were entirely eliminated, because it would be impossible to sufficiently reduce the mass of this structure without dangerously weakening it. By having two counter rotating masses, it is much easier to provide the required small difference in the two masses to obtain the desired net gyroscopic effect.

Obvious modifications in the arrangement and details of the various parts and combinations used may be made without departing from the spirit and scope of the present invention as defined in the appended claims.

What is claimed is:

1. A space craft including a central compartment having a resonant jet engine mounted centrally thereacross, a horizontal annular disc having radial passages therein mounted for rotation about said central compartment, to provide a lifting surface for air travel and gyroscopic stabilization, a circular peripheral channel formed around said compartment and a matching concentric channel formed on the internal edge of said annular disc, said two channels forming a continuous connection between said radial passages and the jet engine to provide cyclic inlet and outlet passages therefor, and a power plant in said compartment for rotating said disc.

2. A space craft as defined in claim 1, and a propeller rotatably mounted on a vertical axis over the top of said compartment at and driven by said power plant to provide lift for vertical take-offs or landings when desired and to provide supplementary lift for runway landings and take-offs to shorten the run when required by reducing the required minimum speed.

3. A space craft as defined in claim 1, said compartment being substantially cylindrical with upper and lower conical ends.

4. A space craft as defined in claim 3, said disc having a frusto-conical portion extending downwardly and inwardly over the outer part of the lower conical end of said compartment, a second disc having a conical inner portion closely adjacent the upper conical end of said compartment and an annular outer disc portion over said first annular disc and mounted for rotation in the opposite direction.

5. A space craft as defined in claim 4, including a central vertical shaft in said compartment providing drive means from said powerplant to said second disc, and bevelled ring gears on said discs coupled by meshing bevelled idler gears mounted on horizontal axes on the outside of said compartment to provide reverse rotation to said first disc.

References Cited in the file of this patent

UNITED STATES PATENTS

| | | |
|---|---|---|
| D. 162,560 | Miller | Mar. 20, 1951 |
| 1,038,168 | Marshall | Sept. 10, 1912 |
| 1,660,257 | Crespo | Feb. 21, 1928 |
| 2,054,610 | Volpicelli | Sept. 15, 1936 |
| 2,377,835 | Weygers | June 5, 1945 |
| 2,567,392 | Naught | Sept. 11, 1951 |
| 2,730,312 | Crookes | Jan. 10, 1956 |

FOREIGN PATENTS

| | | |
|---|---|---|
| 517,359 | Belgium | Feb. 28, 1953 |
| 1,070,544 | France | Feb. 24, 1954 |